United States Patent [19]
Kimura

[11] 4,279,484
[45] Jul. 21, 1981

[54] APPARATUS FOR MEASURING A RANGE TO A SUBJECT
[75] Inventor: Tadashi Kimura, Tokyo, Japan
[73] Assignee: Olympus Optical Co., Ltd., Tokyo, Japan
[21] Appl. No.: 81,090
[22] Filed: Oct. 2, 1979
[30] Foreign Application Priority Data
Oct. 5, 1978 [JP] Japan .................................. 53/122868
[51] Int. Cl.³ .......................... G03B 13/20; G03B 1/36
[52] U.S. Cl. ....................................... 354/25; 250/204
[58] Field of Search ...................... 354/25, 56, 59, 199, 354/222, 163–169, 195, 200, 201; 356/1, 4, 8, 219, 225; 250/201, 204

[56] References Cited
U.S. PATENT DOCUMENTS

| | | | |
|---|---|---|---|
| 2,805,608 | 9/1957 | Leitz | 354/166 |
| 3,536,408 | 10/1970 | Norwood | 354/59 X |
| 4,072,969 | 2/1978 | Cheavin | 354/166 |
| 4,159,169 | 6/1979 | Sato | 354/25 |

Primary Examiner—L. T. Hix
Assistant Examiner—William B. Perkey
Attorney, Agent, or Firm—Haseltine & Lake

[57] ABSTRACT

An apparatus for measuring a range to a subject comprising a first optical system for forming a first stationary image of the subject on a first photosensitive element such as a photosensor array, a second optical system for forming a second image of the subject on a second photosensitive element, said second image being shifted with respect to the first stationary image by rotating a rotatable scanning mirror of the second optical system, and a pin hole member having first and second pin holes formed therein and arranged in front of the first and second photosensitive elements in such a manner that the pin hole member can be moved in a direction parallel to optical axes of the first and second photosensitive elements as well as in a plane perpendicular to the optical axis so as to change a size and a position of a range measuring area with respect to a field of view. When the apparatus is installed in an automatically focusing camera, the scanning mirror is rotated in cooperation with a camera lens which is brought into an in-focused position with respect to the subject when the first and second images impinging upon the first and second photosensor arrays are most alike.

5 Claims, 20 Drawing Figures

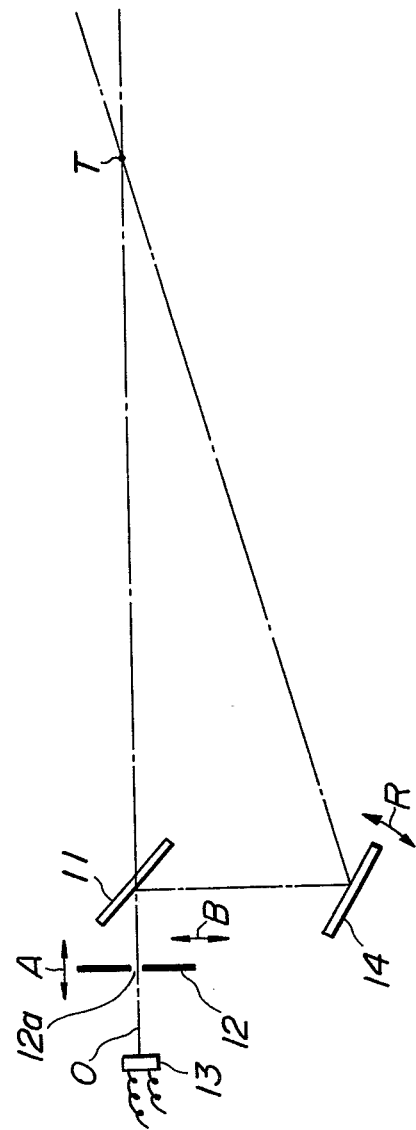

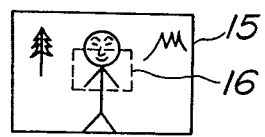 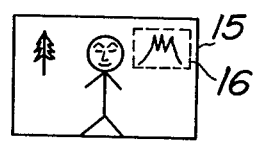 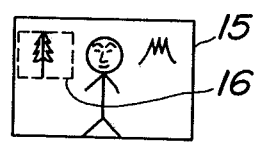
FIG. 7a  FIG. 7b  FIG. 7c
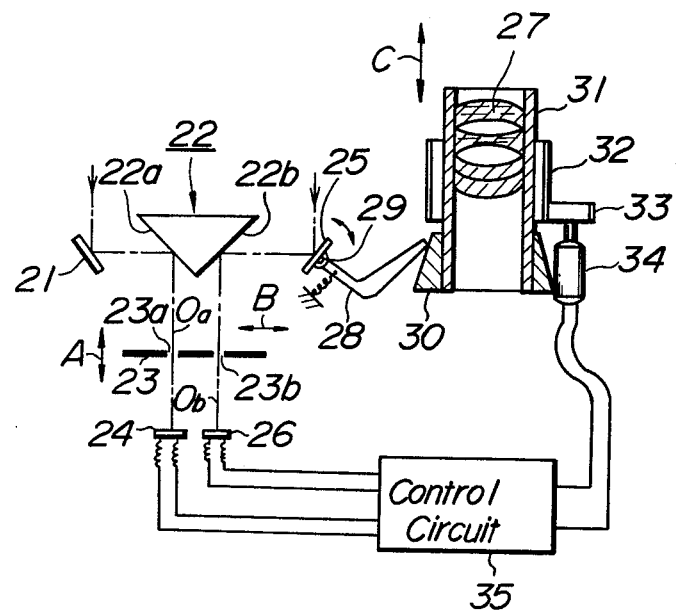
FIG. 8

APPARATUS FOR MEASURING A RANGE TO A SUBJECT

BACKGROUND OF THE INVENTION

The present invention relates to an apparatus for measuring a range to a subject comprising a first optical system which forms a first stationary image of the subject, a second optical system which forms a second image of the subject, said second image being movable with respect to the first stationary image by rotating a scanning mirror of the second optical system, and a photoelectric converting device which receives said first and second images and produces a signal representing an in-focused condition when said first and second images impinging upon the photoelectric converting device coincide with each other.

Such an apparatus has been known and has been used in conventional range finder camera. Upon taking a photograph with such a camera an operator need not adjust an objective lens or camera lens in dependence upon a distance from the lens to a subject at which the camera lens is aimed and thus photographing operation is very easy and simple.

FIG. 1 shows an embodiment of a known range measuring apparatus for use in an automatically focusing camera. A first image of a subject to be photographed is formed on a first photosensitive element 4a by means of a fixed reflecting mirror 1, a first reflecting surface 2a of a rectangular prism 2 and a first lens 3a, while a second image of the subject is formed on a second photosensitive element 4b via a rotatable scanning mirror 5, a second reflecting surface 2b of the prism 2 and a second lens 3b. The first image is stationary, but the second image is movable by rotating the scanning mirror 5 as shown by an arrow R. Thus when the scanning mirror 5 is rotated, the second image is shifted with respect to the stationary first image. Therefore, when the first and second images impinging upon the first and second photosensitive elements 4a and 4b, respectively, coincide with each other, these elements 4a and 4b produce almost same signals. The rotatable mirror 5 is coupled by means of a suitable link mechanism with a driving mechanism for moving a camera lens along its optical axis. When the outputs from the photosensitive elements 4a and 4b become identical with each other, the rotation of the mirror 5 and thus the movement of the camera lens are stopped. At this time, the camera lens is correctly focused with respect to the subject at which the camera lens is aimed.

In general, such an apparatus is advantageously applied to a so-called compact camera in which a camera lens could not be exchanged, because a position and a size of a range measuring area which is projected on the photosensitive element are always fixed with respect to a field of view, i.e., an image of the scene which can be seen by means of a viewing finder. Usually, a center area of the field of view is selected as the range measuring area. However, it is preferable that the position and/or size of the range measuring area can be changed in case that an attachment lens is to be attached in front of the camera lens, the camera lens is to be focused to a subject which does not situate at the center of the field of view, or the camera lens is to be exchanged by other lenses which have different focal lengths. This will be explained more in detail with reference to FIGS. 2a to 2c. These figures show images of a scene which can be seen via the viewing finder in case of attaching to a camera body a wide angle lens, a standard lens and a telephoto lens, respectively. As illustrated in these figures, an angle of view is successively decreased according to the lenses to be used, but the range measuring area M denoted by a broken line is not changed. That is to say, the position and size of the range measuring range M is fixedly determined with respect to the field of view, i.e., the image which can be seen via the viewing finder. Therefore, when the attachment lens is attached to the camera lens or the camera lens is exchanged by other lenses having different focal lengths, a ratio between the range measuring area M and the field of view is changed to a great extent. This results in that an accuracy of range measurement might be extremely affected, particularly in a proximity photographing. In order to change the size of the range measuring area M it is necessary to change, move or exchange the lenses 3a and 3b arranged in the range finder. However, such a measure results in a complicated and large-scale construction of the range finder.

Moreover, in the known range finder, the position of the range measuring area M is fixed at the center of the field of view and thus the manner of photographing or a composition of photograph is limited, because a subject with respect to which the camera lens is in-focused should be brought always at the center of the image which can be seen through the viewing finder.

SUMMARY OF THE INVENTION

The present invention has for its object to provide an apparatus for measuring a range to a subject in which a position and/or a size of a range measuring area can be changed at will with respect to a field of view.

It is another object of the invention to provide a range measuring apparatus which can be constructed in small and compact.

It is still another object of the invention to provide a camera comprising a range finder in which a position and/or a size of a range measuring area with respect to an image which can be seen by means of a viewing finder can be changed in a very simple manner.

It is still another object of the invention to provide a camera with a range finder in which a size of a measuring area with respect to an image which can be seen by means of a viewing finder can be changed automatically upon exchanging camera lenses.

According to the invention an apparatus for measuring a range to a subject comprises an optical system which includes a rotatable scanning mirror and defines a first optical path for forming a first stationary image of the subject and a second optical path for forming a second image of the subject, said second image being shifted with respect to the first stationary image by rotating said scanning mirror arranged in the second optical path; a photoelectric converting device for receiving said first and second images of the subject to produce a signal representing an in-focused condition when said first and second images coincide with each other; and a pin hole member arranged in said first and second optical paths in front of said photoelectric converting device, said pin hole member and photoelectric converting device being movable relative to each other so as to change a geometrical configuration of a range measuring area with respect to a field of view.

In an embodiment of the range measuring apparatus according to the invention, the pin hole member is moved with respect to the photoelectric converting device in a direction parallel to an optical axis so as to change a size of said measuring area with respect to the field of view.

In another embodiment of the invention, the pin hole member is moved in a plane perpendicular to the optical axis so as to shift the range measuring area with respect to the field of view.

BRIEF DESCRIPTION OF THE DRAWINGS

The present invention will be described more in detail with reference to attached drawings, in which:

FIG. 3 is a schematic view dipicting an embodiment of a range measuring apparatus according to the present invention;

FIGS. 7a, 7b and 7c are schematic views showing a relative shift of the range measuring area in the field of view;

FIG. 8 is a schematic view showing another embodiment of the range measuring apparatus according to the present invention installed in a camera;

DETAILED DESCRIPTION OF THE PREFERRED EMBODIMENTS

Figure 1:
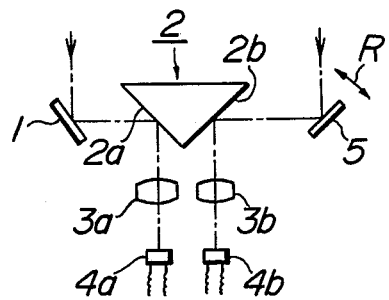
FIG. 1 is a schematic view showing an embodiment of a known range measuring apparatus comprising an optical system of a range finder.
Figure 2A:
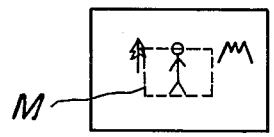
FIGS. 2a, 2b and 2c are schematic views illustrating geometrical relations between a range measuring area and a field of view in case of changing an angle of view in the known range finder shown in FIG. 1.
Figure 2B:
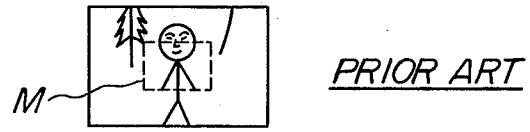
Figure 2C:
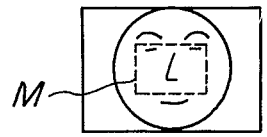

FIG. 3 shows an embodiment of a range measuring apparatus according to the present invention.

A first stationary image of a subject or scene is formed on a photosensitive element 13 by means of a semitransparent or half mirror 11 and a pin hole member 12 having a single pin hole 12a. A second image of the scene is formed on the photosensitive element 13 by means of a rotatable reflecting mirror 14, the half mirror 11 and the pin hole 12a. When the mirror 14 is rotated as shown by an arrow R, the scene at which the camera is aimed is scanned and a triangulation crossover point T moves through the range from a near distance to infinity, or vice versa. Then the second image impinging upon the photosensitive element 13 is shifted with respect to the first stationary image which is also impinging upon the photosensitive element 13. When these first and second images become most alike, the apparatus has just focused at the subject a distance to which is to be measured. In such a focused condition, the photosensitive element 13 produces the maximum output. If use is made of a photosensor array such as a charge coupled device as the element 13, a so-called correlation signal which can be calculated from outputs of the photosensor array becomes maximum. In this manner, the range to the subject can be measured by a rotational angle of the rotatable mirror 14 at the time when the photosensitive element 13 produces the maximum output.

In case of installing such a range measuring apparatus in a camera, the rotatable mirror 14 is coupled with a driving mechanism for a camera lens via a suitable link. When the first and second images formed on the photosensitive element 13 coincide with each other, the camera lens is brought into an in-focused position. This in-focused condition can be detected with the aid of the output from the photosensitive element 13.

The pin hole member 12 may be formed by a suitable plate such as a thin metal plate having formed therein the pin hole 12a. In the present embodiment, the pin hole member 12 is so arranged that it can be moved in a direction parallel to an optical axis O of the optical system as shown by a double-headed arrow A as well as in a plane perpendicular to said direction, i.e., the optical axis O as shown by a double-headed arrow B in order to change a size and a position of a range measuring area.

Figure 4A:
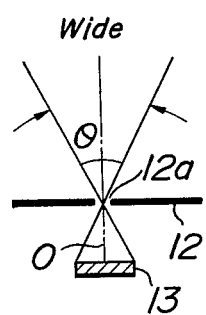
FIGS. 4a, 4b and 4c are schematic views showing a variation in an angle of view of a range measuring area in case of changing a distance between a pin hole and a photosensitive element.
Figure 4B:
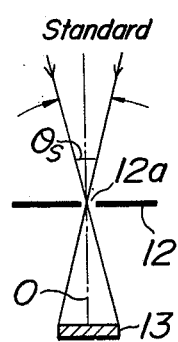
Figure 4C:
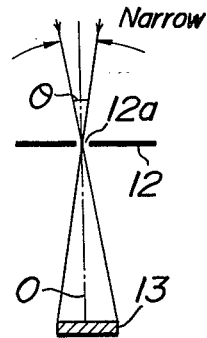
Figure 5A:
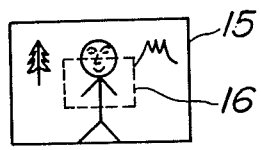
FIGS. 5a, 5b and 5c are schematic views illustrating a variation in the range measuring area.
Figure 5B:
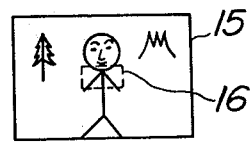
Figure 5C:
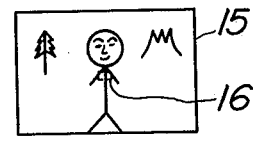

When the pin hole member 12 is moved in the direction A, an angle $\theta$ of field viewed from the photosensitive element and thus the size of the range measuring area varies with respect to the field of view, i.e., an image which can be seen via a viewing finder as illustrated in FIGS. 4a, 4b and 4c. When the pin hole member 12 is moved toward the photosensitive element 13 as shown in FIG. 4a, the angle $\theta$ becomes wider in comparison with a standard angle $\theta_s$ shown in FIG. 4b. On the contrary, when the pin hole member 12 is moved far from the photosensitive element 13, the angle $\theta$ becomes narrower as shown in FIG. 4c than the standard angle. According to this change in the angle $\theta$, the size of the range measuring area 16 for use in the range measurement is also changed with respect to the field of view 15 as shown in FIGS. 5a, 5b and 5c. These FIGS. 5a, 5b and 5c correspond to the FIGS. 4a, 4b and 4c, respectively. In this manner, by changing a distance from the pin hole 12a to the photosensitive element 13 the size of the range measuring area 16 with respect to the field of view 15 can be adjusted. It should be noted that due to a specific property of the pin hole 12a the focused images are always formed on the photosensitive element 13 even though the pin hole member 12 is displaced with respect to the element 13.

Figure 6A:
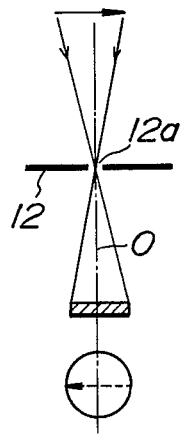
FIGS. 6a, 6b and 6c are schematic views depicting a change in a position of the range measuring area in accordance with a movement of a pin hole.
Figure 6B:
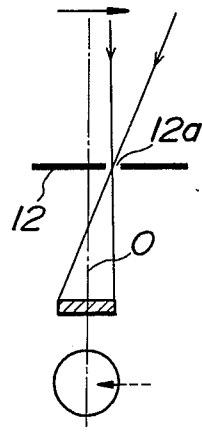
Figure 6C:
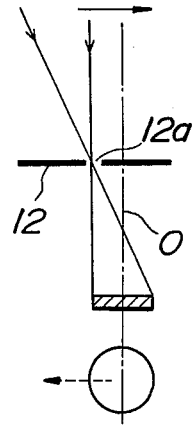

When the pin hole member 12 is moved in the plane perpendicular to the optical axis O as symbolically shown by the double-headed arrow B in FIG. 3, the position of the range measuring area with respect to the viewing field varies as illustrated in FIGS. 6a, 6b and 6c.

When the optical axis of the pin hole 12a coincides with that of the photosensitive element 13, a substantially center part in the field of view 15 is imaged on the photosensitive element 13 as the range measuring area 16 as shown in FIG. 6a.

When the pin hole 12a is moved toward right and upper with respect to the optical axis O of the photosensitive element 13, a right and upper part in the field of view 15 is imaged on the photosensitive element 13 as the range measuring area 16 as depicted in FIG. 6b. When the pin hole 12a is moved toward left and upper with respect to the optical axis O, a left and upper part in the field of view 15 is projected on the photosensitive element 13 as the measuring area 16 as illustrated in FIG. 6c. According to this change in the portion or part imaged on the photosensitive element 13, the position of range measuring area 16 can be shifted at will with respect to the field of view 15 as shown in FIGS. 7a, 7b and 7c. These FIGS. 7a, 7b and 7c correspond to the FIGS. 6a, 6b and 6c, respectively.

As explained above, in the present embodiment, both the size and position of the range measuring area 16 can be changed with respect to the field of view 15 by moving the pin hole member 12 in the direction A parallel to the optical axis O and in the plane perpendicular to the optical axis O as symbolically shown by the double-headed arrow B, respectively.

FIG. 8 shows another embodiment of the range measuring apparatus according to the present invention installed in a camera.

In this embodiment, a first stationary image of a subject to be photographed is formed on a first photosensitive element 24 by means of a fixed reflecting mirror 21, a first reflecting surface 22a of a rectangular prism 22 and a first pin hole 23a of a pin hole member 23, while a second movable image of the subject is formed on a second photosensitive element 26 via a rotatable reflecting mirror 25, a second reflecting surface 22b of the prism 22 and a second pin hole 23b of the pin hole member 23. The reflecting mirror 25 is rotated in cooperation with a camera lens 27 by means of a lever 28 rotatable about a shaft 29 about which the mirror 25 also rotates. One end of the lever 28 is secured to the mirror 25 and a free end of the lever is resiliently urged against a surface of a tapered ring 30 which is secured to an outer surface of a lens barrel 31 of the camera lens 27. Around the lens barrel 31 is also secured a cylindrical gear 32 which engages with a gear 33 coupled to a driving shaft of an electric motor 34. By means of a known helicoid mechanism when the lens barrel 31 is rotated, and lens 27 is moved along its optical axis together with the barrel as illustrated by a double-headed arrow C.

The electric motor 34 is controlled by a control circuit 35 which receives outputs from the first and second photosensitive elements 24 and 26. Each of these photosensitive elements may be constructed by a photosensor array such as a charge coupled device. In such a case, the control circuit 35 produces a correlation signal which becomes maximum when the first and second images impinging upon the elements 24 and 26 are most alike. Then, the control circuit 35 ceases to energize the electric motor 34 and the movement of the camera lens 27 is stopped. At such an instance, the camera lens 27 is focused correctly with respect to the subject to be photographed. In this manner, the camera lens 27 can be automatically brought into an in-focused condition.

The pin hole member 23 has formed therein a pair of pin holes 23a and 23b and can be moved in a direction parallel to the optical axes $O_a$ and $O_b$ of the photosensitive elements 24 and 26, respectively, as shown by an arrow A as well as in any direction in a plane perpendicular to the optical axes. The latter movement is symbolically represented by an arrow B in FIG. 8. In this manner, both the size and position of the range measuring area can be simply changed with respect to the field of view.

In the embodiments explained above the pin hole member can be moved in the direction parallel to the optical axis of the photosensitive element as well as in the plane perpendicular to the optical axis so as to change the size and position of the range measuring area with respect to the field of view. It should be noted that the present invention is not limited to such embodiments, but may be modified in various manners. For instance, the pin hole member may be moved only in the direction parallel to the optical axis of the photosensitive element. Then only the size of the range measuring area is changed. Further, the pin hole member may be moved only in the plane perpendicular to the optical axis. In this case, only the position of the range measuring area can be changed. Moreover, the direction of the movement of the pin hole member in such a plane may be limited to a particular direction. In general, it is preferable that the range measuring area is moved horizontally in the field of view.

Figure 9:
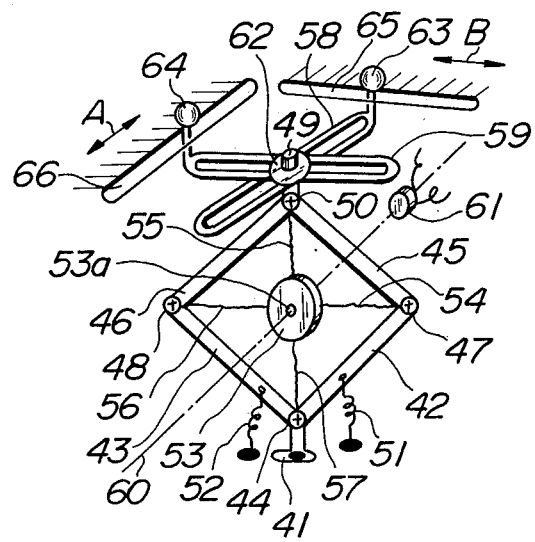
FIG. 9 is a perspective view showing an embodiment of a mechanism for moving a pin hole.

FIG. 9 is a perspective view showing an embodiment of a mechanism for moving a pin hole member in a direction parallel to an optical axis of a photosensitive element as well as in a horizontal direction in a plane perpendicular to the optical axis. One end of a projection 41 is secured to a fixed part in a camera body and one ends of a pair of strip-shaped plates 42 and 43 are universally journaled to the other end of projection 41 by means of a shaft 44. To the other ends of these plates 42 and 43 are rotatably secured one ends of strip-shaped plates 45 and 46, respectively, by means of shafts 47 and 48, respectively. The other ends of these plates 45 and 46 are universally journaled to a lower end of a short rod 49 by means of a shaft 50. Therefore, a quadrilateral defined by the four plates 42, 43, 45 and 46 can be deformed at will. A pair of coiled springs 51 and 52 are arranged between the fixed part and the plates 42 and 43, respectively, so as to produce a force which causes the quadrilateral to expand horizontally.

A disc-like pin hole member 53 having a pin hole 53a formed therein is suspended at a center of the quadrilateral by means of four wires 54, 55, 56 and 57 made of elastic material such as rubber. Inside of the quadrilateral except for the pin hole disc 53 is covered with a sheet member (not shown) made of easily deformable material such as cloth. If this sheet member is made of elastic material such as rubber, the elastic wires 54 to 57 may be dispensed with and the pin hole member 53 may be supported by the elastic sheet member.

The upper end of the rod 50 is extended through elongated recesses formed in guide members 58 and 59 which are arranged perpendicularly one another. That is to say, the guide member 58 extends in a direction parallel to an optical axis 60 of a photosensitive element 61 and the guide member 59 extends horizontally in a direction perpendicular to the optical axis 60. In order to prevent the rod 49 from being pulled out of the recesses due to the force of the springs 51 and 52 a stop ring 62 is secured to the rod. Thus, the stop ring 62 is urged against the guide member 59 with a weak force, because the force of the springs 51 and 52 is relatively small. To one ends of the guide members 58 and 59 are secured pins 63 and 64, respectively, which extend to the external of the camera body through elongated recesses 65 and 66, respectively, formed in the camera body.

When the pin 64 is moved in the direction parallel to the optical axis 60 as shown by a double-headed arrow A, the rod 49 moves along the elongated recess formed in the guide member 58. Then, the quadrilateral is deformed and thus the pin hole disc 53 moves along the optical axis 60. In this manner, the size of the range measuring area can be changed.

When the pin 63 is moved in the horizontal direction perpendicular to the optical axis along the recess 65 as illustrated by a double-headed arrow B, the rod 49 moves in the same direction along the recess formed in the guide member 59. Then, the pin hole member 53 moves horizontally in the direction perpendicular to the optical axis 60 due to a deformation of the quadrilateral. In this manner, the position of the range measuring area can be shifted horizontally.

Figure 10:
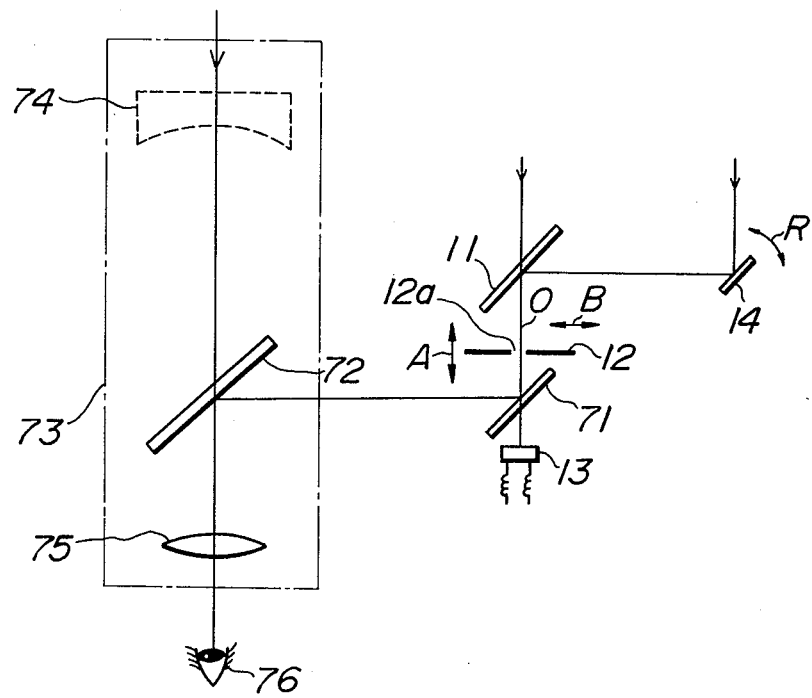
FIG. 10 is a schematic view illustrating an optical system for indicating a position of the range measuring area in an image seen via a viewing finder.

In case of installing the range measuring apparatus according to the invention in a camera it is preferable that a position of the range measuring area is indicated in a viewing finder. FIG. 10 shows an embodiment of an optical system for indicating the position of the range measuring area in the image. An optical system of the range measuring apparatus of this embodiment is substantially same as that shown in FIG. 3 and thus the same elements are denoted by the same reference numerals. In the present embodiment, a half mirror 71 is arranged in an optical path O of a photosensitive element 13 so as to reflect a part of a light passing through a pin hole 12a to a half mirror 72 arranged in a viewing finder 73 which comprises a lens 74 and an eyepiece 75. The light reflected by the half mirror 72 impinges upon an eye 76 of a viewer through the eyepiece 75. In this case, the viewer can see an image of the pin hole 12a together with an image of a subject or scene at which a camera lens (not shown) is aimed. Due to difference in dioptor for these images if the viewer's eye 76 is focused to the image of scene, the image of the pin hole is seen as a defocused image. Therefore, a gradated light spot can be seen in the image of the scene. When the pin hole member 12 is moved in a plane perpendicular to the optical axis O, the position of this light spot in the image which can be seen through the view finder moves accordingly. In this manner, it is possible to know the position of the range measuring area in the image which can be seen via the viewing finder.

According to the invention, it is further possible to change the size of the range measuring area in an automatic manner in response to an exchange of a camera lens. For instance, the pin 64 shown in FIG. 9 may be moved in cooperation with an exchanging operation of the camera lens in such a manner that a ratio between an area of the range measuring zone and an area of an image of a subject is kept substantially constant.

In the embodiments explained above, the pin hole member is moved with respect to the fixedly arranged photoelectric converting device, but the photoelectric converting device may be moved relative to the fixedly arranged pin hole member or both the pin hole member and the photoelectric converting device may be moved.

As above described, the range measuring apparatus according to the invention can measure a range to a subject accurately by changing the size and the position of range measuring area with respect to a field of view. Therefore, when such a range measuring apparatus is installed in a camera in which a camera lens can be exchanged or an attachement lens can be removably secured to a camera lens, an optimal range finding can be effected and variety of photographing can be achieved. Further, according to the invention, since use is made of a pin hole instead of lens, the apparatus can be made small in size and simple in construction and thus can be advantageously applied to small size cameras such as a compact camera.

What is claimed is:

1. An apparatus for measuring a range to a subject comprising an optical system which includes a rotatable scanning mirror and defines a first optical path for forming a first stationary image of the subject and a second optical path for forming a second image of the subject, said second image being shifted with respect to the first stationary image by rotating said scanning mirror arranged in the second optical path; a photoelectric converting device for receiving said first and second images of the subject to produce a signal representing an infocused condition when said first and second images coincide with each other; a pin hole member arranged in said first and second optical paths in front of said photoelectric converting device; and means for supporting said pin hole member and photoelectric converting device movable relative to each other in a direction parallel to an optical axis of the photoelectric converting device so as to change a size of a range measuring area with respect to a field of view.

2. An apparatus according to claim 1, wherein said means for supporting the pin hole member and the photoelectric convertind device movably relative to each other has means for also moving said pin hole member and said photoelectric converting device relative to each other in a plane perpendicular to said optical axis so as to change both size and position of the range measuring area relative to the field of view.

3. An apparatus according to claim 2, wherein said pin hole member and the photoelectric converting device are movably arranged relative to each other in said plane only in a horizontal direction.

4. An apparatus according to claim 2, wherein said optical system comprises a semi-transparent mirror for forming an optical path which is common to the first and second optical paths between the semi-transparent mirror and the photoelectric converting device which comprises a fixed single common photosensitive element, and said pin hole member having a single common pin hole formed therein is movably arranged in said common optical path.

5. An apparatus according to claim 2, wherein said optical system comprises a fixed reflecting mirror and a rectangular prism for forming parallel optical paths between the prism and the photoelectric converting device which comprises a pair of fixedly arranged photosensitive elements, and said pin hole member has formed therein a pair of pin holes and is arranged movably in said parallel optical paths.

* * * * *